(12) United States Patent
Sithes

(10) Patent No.: US 8,292,981 B2
(45) Date of Patent: Oct. 23, 2012

(54) LOW MAINTENANCE AIR CLEANING SYSTEM FOR WELDING CHAMBERS

(75) Inventor: Edwin F. Sithes, Wake Forest, NC (US)

(73) Assignee: Oskar Air Products, Inc., Youngsville, NC (US)

( * ) Notice: Subject to any disclaimer, the term of this patent is extended or adjusted under 35 U.S.C. 154(b) by 389 days.

(21) Appl. No.: 12/245,101

(22) Filed: Oct. 3, 2008

(65) Prior Publication Data

US 2009/0113857 A1 May 7, 2009

Related U.S. Application Data

(63) Continuation-in-part of application No. 11/936,674, filed on Nov. 7, 2007, now abandoned.

(51) Int. Cl.
*B01D 59/50* (2006.01)

(52) U.S. Cl. ............ 55/385.1; 55/293; 55/317; 55/354; 55/385.2; 55/430; 95/278; 95/280

(58) Field of Classification Search .............. 55/293, 55/307, 317, 320–323, 354, 430, 385.2, 302, 55/283, DIG. 18, DIG. 36; 95/278, 280; 266/48–49; 454/49, 63, 66
See application file for complete search history.

(56) References Cited

U.S. PATENT DOCUMENTS

| 3,350,855 | A | * | 11/1967 | Revell | 55/354 |
|---|---|---|---|---|---|
| 4,294,597 | A | * | 10/1981 | Archer et al. | 55/283 |
| 4,359,330 | A | | 11/1982 | Copley | |
| 4,566,969 | A | * | 1/1986 | Klein | 210/387 |
| 4,606,260 | A | | 8/1986 | Cox | |
| 4,786,293 | A | | 11/1988 | Labadie | |
| 4,881,957 | A | * | 11/1989 | Shofner | 95/23 |
| 5,084,076 | A | * | 1/1992 | Cairns | 55/304 |
| 5,230,726 | A | * | 7/1993 | Smith et al. | 55/487 |
| 6,036,736 | A | | 3/2000 | Wallace et al. | |
| 6,290,740 | B1 | | 9/2001 | Schaefer | |
| 6,306,188 | B1 | * | 10/2001 | Karlsson | 55/381 |
| 6,758,875 | B2 | * | 7/2004 | Reid et al. | 55/385.2 |
| 7,052,532 | B1 | * | 5/2006 | Liu et al. | 96/154 |
| 2004/0020365 | A1 | * | 2/2004 | Hansen et al. | 95/280 |

* cited by examiner

*Primary Examiner* — Jason M. Greene
*Assistant Examiner* — Karla Hawkins
(74) *Attorney, Agent, or Firm* — James G. Passé; Passé Intellectual Property, LLC

(57) ABSTRACT

The present invention relates to a novel enclosure and air filtration design for use with robotic welding stations. It includes a novel frame design, novel air cleaning systems and systems for reducing the frequency of cleaning the air cleaning system.

14 Claims, 8 Drawing Sheets

LOW MAINTENANCE AIR CLEANING SYSTEM FOR WELDING CHAMBERS

This application is a continuation-in-part of U.S. nonprovisional patent application No. 11/936,674 filed on Nov. 7, 2007 now abandoned and incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to air cleaning systems for welding chambers. In particular, the present invention relates to an air cleaning system which provides a reduction in maintenance for cleaning the air flow path and filters of an air cleaning system and in some embodiments obviates the need for a spark arrestor.

2. Description of Related Art

Welding of metal parts and welding to build products is an inherently dangerous endeavor. Not only are the sparks and hot metal pieces easy to start fires, cause burns and the like, but the gases and dust created during the welding process can be toxic, as well as detrimental, to the product being produced. Generally, welding is carried out in a welding chamber which controls dust and particulate matter generated by the process of circulating and filtering the air that enters the welding chamber before returning it to the surrounding environment.

Older welding chamber air filtration systems consist of an air cleaning system which is positioned on the floor just outside the welding chamber, or outside the building the welding chamber is positioned in. They are connected to the air flow from the welding chamber by one or more air hoses. Not only does this older system waste valuable floor space, but use of ducting adds considerably to the maintenance and cleaning of a welding system. Further, ducts can collapse spilling their contents and causing an even further maintenance catastrophe.

A more recent approach to air handling systems for welding chambers which is superior in many ways to the side mounted units, has been the introduction of the overhead air cleaning system for welding stations. These air cleaning systems have the ability to be in direct connection with the interior of a chamber, eliminating the need for ducting, and also eliminate many of the other problems associated with side mounted air systems and lengthy ducted systems.

The air cleaning systems contain one of a variety of different types of air filtration devices. One cleaning filter method in addition to standard charcoal, HEPA and other filter units is the self cleaning pulsed air filter. These filters comprise a paper or cloth filter which air moves through trapping particles. At desired intervals, a pulse of reverse flow air is blown through the filter, releasing the trapped particles for collection below the filter. Typically, air cleaning systems provide a door which must be opened and a collector below the air filter also must be handled and cleaned. These work well, but expose the worker who cleans the unit to the filter and interior of the filter chamber every time the tray needs to be cleaned, exposing the worker and surrounding environment to a higher level of contaminants. In U.S. Pat. No. 4,359,330 issued Nov. 16, 1982 to Copley, there is disclosed a self cleaning pulsed air cleaner designed for use in air cleaning systems. The system describes methods for preventing the recontamination of the air filter after it has been pulsed but, nothing to prevent exposure to the filter every time the collection tray is cleaned.

In addition to a wide variety of filters there are several different approaches to the air cleaning system. In U.S. Pat. No. 6,036,736 issued Mar. 14, 2000 to Wallace, et al., there is disclosed a ventilating method wherein an air blower, suitable for fumes filtering by a contaminate filter, a charcoal filter and a HEPA filter is disclosed. The device is mounted on top of a framed box and includes spark arrestor means. In U.S. Pat. No. 4,606,260 issued Aug. 19, 1986 to Cox, there is disclosed a movable welding station with a top frame mounted exhaust hood, including charcoal filters. In U.S. Pat. No. 6,758,875 issued Jul. 6, 2004 to Reid et al., there is disclosed a top frame mounted air cleaning system. The system includes a blower housing, frame, filters, shields and a spark arrestor. This particular air cleaning system has a framing system for supporting the air cleaning on top of the cabinet. The support consists of corner posts with a top corner to corner cross member of long, heavy, metal "beams". The beams are indicated as relatively tall and in some embodiments must be further supported by cross posts (i.e. cross members like the upright posts which add support to the heavy beams of the invention, FIGS. 1 and 2). Upright posts and cross beams are a fairly standard construction method for framing systems in general and as with any older technology, present a variety of problems including their size and greater weight.

While all the above overhead air cleaning system inventions include spark arrestors and cleaning filters, their close positioning to the welding activity cause increased problems with filter replacement, cleaning and spark problems including catastrophic fires. In addition, heavy, thick or large cross beams are more expensive, have weight related problems, are harder to work with and still need in some cases, further support to work with heavy air blower units, filters must be replaced fairly frequently, sparks start fires and the labor to shut down and clean the devices and filters becomes more costly than non top mounted devices. Even with top mounted devices cleaning of filters becomes a problem and when the air cleaning system must be cleaned, that is valuable time that the welding system cannot be used for its intended purpose.

The problems of the present state of the art would be greatly reduced with new methods and devices that reduce the frequency of cleaning, improve the ease of cleaning, reduce the possibility of spark initiated fires and provide better designed framing to support top mounted air handling systems for welding booths.

SUMMARY OF THE INVENTION

The present invention has several improvements over the present state of the art. It has been discovered by including a roller filter in the airflow channel of a welding booth, the air cleaning system greatly improves the cleaning of the air and reduces the frequency and difficulty in cleaning the air cleaning system. In addition, other novel aspects further improve the air cleaning system include: (a) a series of two or more spark arrestors in the air handling line, and (b) cleaning drawers for easy cleaning of pulsed air cleaners. In yet another embodiment having a channel side entry for air, can eliminate the need altogether for a spark arrestor.

Accordingly, one embodiment of the invention comprises an air cleaning system for a welding station, comprising a roller filter positioned in an airflow path of the air cleaning system.

In another embodiment of the invention there is a welding station wherein the welding station air cleaning system comprises:
 a) a welding station frame defining a welding chamber comprising spaced upright posts defining the sides and a grid of horizontal posts defining a top of the chamber wherein the top defines an air cleaner opening;
 b) a blower housing having an airflow path and an airflow path inlet on a bottom portion of the housing, wherein the housing is supported by the grid of horizontal posts and wherein the inlet is positioned in direct fluid communication with the chamber;
 c) at least one spark arrestor in the airflow path of the blower housing;
 d) a first air filter comprising a roller filter positioned after the at least one spark arrestor in the airflow path; and
 e) a second air filter positioned after the first air filter in the airflow path.

In yet another embodiment of the present invention there is disclosed a welding station frame defining a welding chamber comprising:
 a) spaced upright posts defining the sides and a grid of horizontal posts defining a top of the chamber wherein the top defines an air cleaner opening;
 b) a blower housing having an airflow path and an airflow path inlet on a bottom portion of the housing wherein the housing is supported by the grid of horizontal posts and wherein the inlet is positioned in direct fluid communication with the chamber;
 c) at least one spark arrestor in the airflow path;
 d) a first air filter comprising a roller filter positioned after the at least one spark arrestor in the airflow path; and
 e) a second air filter positioned after the first air filter in the airflow comprising a pulse cleaning system and a drawer for collecting and removing material from the pulse cleaning system.

The present invention also comprises a welding station having an air cleaning system with at least one air filter which comprises a collection drawer beneath the at least one air filter for collecting material which falls off of the air filter.

In yet another embodiment of the invention there is disclosed an air cleaning system for use without a spark arrestor comprising:
 a) a blower housing having a bottom surface;
 b) an air inlet chamber positioned on the bottom surface, having one or more air inlets and having at least one air deflector;
 c) a housing air inlet positioned in the housing bottom surface in air communication with the air inlet chamber;
 d) one or more air filters in the housing positioned so that air entering the housing air inlet from the air inlet chamber will pass through the filters.

These and other objects of the present invention will be clear when taken in view of the detailed specification and disclosure in conjunction with the appended figures.

DETAILED DESCRIPTION OF THE INVENTION

Figure 1:
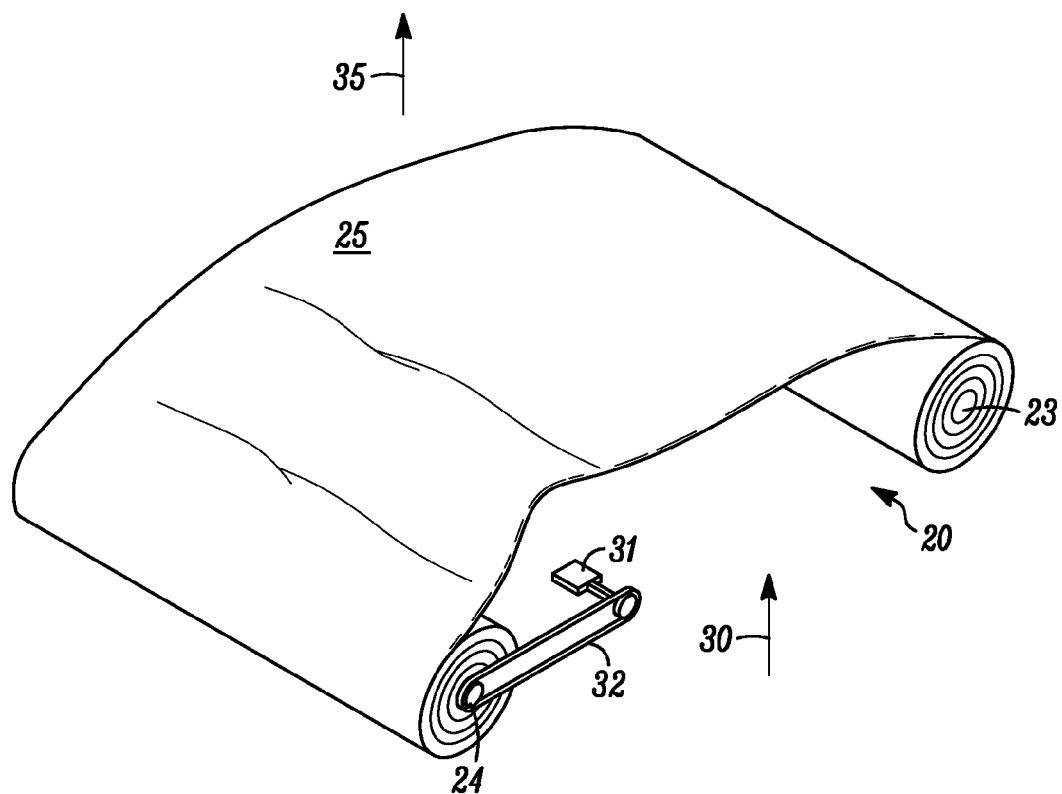
FIG. 1 is a perspective view of an embodiment of a roller filter used in the present invention.

Up to this point in time there has been a decision balance between side-mounted air cleaners for welding stations which reduce fire hazards, but have cleaning problems and waste space and their counter-part top mounted air cleaning systems which save space, increase fire hazards because of their closer proximity to welding sparks yet still retain cleaning issues. Further, framing issues like post and beam construction are costly, large, and still often require supplementary framing to support a top mounted air cleaning system. This framing system is not only wasteful, but limits additional air cleaning accessories or improvements if they add size or weight to the system. It has been discovered that a number of improvements when taken together or separately improve the system when looking at the prior art problems. Particularly, a post and grid framing system saves weight, versus a post and beam frame and supports increased weight which in turn allows use of a secondary roller sheet air cleaner with standard air cleaners to improve cleaning. Further, use of a plurality of spark arrestors improves the fires resistance of the units beyond what is normally experienced. Even further, the use of a collection drawer beneath at least one air filter can allow one to clean up the interior of the housing unit for the blower, without need to open the doors and expose the contents to the environment, prior to changing the filter. In yet another embodiment it is found that air cleaners can be supported from above, such as by hanging instead of being supported by the top of a welding frame. And even further, it is discovered that spark arrestors can be completely eliminated by the use of an air inlet channel, instead of the top of a welding chamber being in direct airflow communication with the opening in the bottom of the air filter housing.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein, and specifically describes embodiments in order for those skilled in the art to practice the invention.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or, in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

As used herein the term "welding station" refers to an enclosed chamber used for welding and for containing the sparks and air emissions caused by the welding activity. Where appropriate, these chambers could also be used for welding by either a robotic or a non-robotic means, but because of the speed and reduced exposure to toxins the chambers are mostly used with robots. The welding station normally consists of an enclosure of some kind, for example, consisting of a frame and with some form of paneling, screening or the like mounted on the frame to form and define the enclosure. In other embodiments the station can be paneling without the need to use a frame especially where the air cleaner is supported (i.e. hung) from above, rather than supported by the top of the frame. In some embodiments, the paneling is solid metal or the like. Other embodiments include metal screening or the like. The choice is within the art but designed to contain sparks as well as the acrid environment and in some embodiments support the air cleaner.

Welding stations also have a means for cleaning the air within the chamber. This is because toxic gases are created within the chamber and must be removed at some point before humans can exist in the space. An "air cleaning system" refers to a system for withdrawing air from the area below the system, such as from a chamber and treating the air to remove air contaminants from the welding process and return cleaned air back to the outside surrounding environment of the welding station. An air cleaning system consists of a blower housing, which includes a blower for withdrawing the air from the chamber. It also includes an airflow path for directing air from the chamber through the blower housing and finally out to the surrounding environment. Within the airflow path of the blower housing are one or more filters designed to clean the air of particulate material. Several designs exist for achieving the cleaning process which all have, prior to the present invention, various advantages and disadvantages but share common elements. Side air cleaning systems as mentioned above sit on the side of the chamber and withdraw air via a ducting system. Top mounted air cleaning systems mount directly on top of the frame of the welding station and draw air directly from the chamber without use of a ducting system. In new embodiments taught herein, top air cleaning systems can be hung above a chamber as well thus not relying on the welding chamber to support the air cleaning system as previously taught.

A roller filter, as used herein, is an air filter comprising a feed reel and a take up reel wherein a long piece of air filtering material moves from the feed to the take up reel as the filter is dirtied by the process of cleaning the air. Normally by moving the take up reel, filtering material is pulled from the feed reel and moved to the take up reel. Other means for moving the filter roll forward could be employed and are within the contemplation of this invention. In one embodiment, the roller filter is an automatic advance filter which automatically advances by a desired means such as by time or by measuring the cleanliness of the filter or other means. In another embodiment, the roller filter can be advanced manually from outside the blower housing without need to open up the housing to advance the roller filter reels. The filter is replaced at the end of its useful life by opening the blower housing (in one embodiment via a housing door) and replacing the roll with a clean roll. This allows a long time to pass before the inside of the blower housing needs to be opened up to the environment and since not all the particulate matter reaches the secondary filters, such as the pulse cleaning system, that filter has to be changed less frequently as well. The roller filter is positioned in the airflow pathway of the air cleaning system. This can be done by placing it in the airflow pathway within the housing, or can be done as a secondary housing and placed in fluid communication with the chamber and the blower house, for example as an add on filter for an existing air cleaning system. In either situation, the roller air filter is positioned in many embodiments to be the first filter of the system. By positioning it first as described above, less cleaning of any secondary or tertiary filters is necessitated. Where the roller filter is placed in the housing and used on a top mounted or top hung air cleaning system, care should be taken in placing at least one spark arrestor prior to the roller filter, so that the roller filter can be positioned relatively close to the inlet of air in the blower housing. In the alternative, no spark arrestor is needed when the air comes into the housing via an air inlet channel described below. Multiple spark arrestors can be used to lower the risk of fire due to the close placement of the roller filter when not using an air inlet channel.

In another embodiment the roller filter has a drawer beneath it. The drawer is positioned such that if particulate material falls off the filter it is collected beneath the filter on the drawer. By sliding out the drawer, the drawer can be emptied without opening the housing further as when one is replacing the roller filter. Another embodiment makes use of a metal, or other permanent material screen, positioned in the airflow path prior to the first filter. In one embodiment, the screen is stainless steel and in a further embodiment the filter can be cleaned, replaced and the like by mounting the screen in a drawer which can be slid open from the environment like the drawers for the filters.

A welding chamber requires a welding station frame when the housing is mounted on (supported by) the welding chamber. One embodiment of such a frame comprises spaced upright posts which define the sides of the chamber. This can be the four corners of the chamber, but can also be along the sides of the chamber. By "posts" is meant tubing of a rigid material such as steel or steel alloy having a diameter of about one-half inch to about 4 inches. The post material tubing can have a square or circular cross section or the like typical for tubing. Upright posting is well known within the art such as taught in U.S. Pat. No. 6,758,875. The top of the frame for the chamber consists of the same post material described above welded or bolted together, or otherwise fashioned into a top grid. See an embodiment in the figures. Horizontal posts will define the top perimeter while additional post pieces will define the air cleaner opening and then further post pieces will define connecting pieces between the outer perimeter and the opening perimeter all in a spaced apart manner. In one embodiment, the posts are all perpendicular or parallel, relative to one another. Note that this top grid construction with smaller tubing avoids use of thicker, harder to use beams of the prior art and the additional support required for such frames as taught in the '875 patent above.

In the case of top mounted or hung air cleaning systems in a blower housing as described above, use of such cleaners in a top of frame mounted configuration increases the possibility of welding spark reaching inside the airflow path of the housing and setting the filters or accumulated particulate matter on fire. To deal with this problem, it is possible to position a spark arrestor in the airflow channel. Normally, a spark arrestor is positioned at or near the opening of the airflow pathway in the blower housing, so in one embodiment it is positioned on the bottom of the housing in fluid communication with the air in the chamber. In another embodiment of the invention, there are two or more spark arrestors used in the airflow path. The two or more spark arrestors would all be positioned prior to the positioning of a first air filter within the airflow pathway. The addition of two or more arrestors has now been shown to reduce the possibility of an extra large spark passing the first spark arrestor and making it to the first filter. In practice there would not be much of a practical need for more than about four spark arrestors in any blower housing and in one embodiment there are two to three spark arrestors.

Another embodiment of the present invention allows for elimination of spark arrestors altogether. In this embodiment an air inlet channel is used in conjunction with the air blower housing. As seen in the figures which are described herein, the air inlet channel is a chamber mounted on the bottom of the housing. The chamber has one or more air inlets positioned along the length of the chamber, for letting air into the chamber and delivering it to the housing opening in the bottom of the housing. In some embodiments they are on the side but they can be in any position of the length of the chamber. By placing at least one deflector or baffle for each opening the air must travel a circuitous route in the chamber before entering the housing, thus insuring that by the time the air enters the housing, there are no longer any live sparks to worry about. In some embodiments there are three or more deflectors per inlet and in some embodiments five or more deflectors per inlet. The number of inlets can be one or more and depends on the air flow the size of the area to be filtered and the like, so 2, 4, 6, 8, 10, 12 or more inlets would be considered embodiments of the invention. The chamber can run the width or length of the housing or less in other embodiments. One skilled in the art can determine the optimum number of inlets in the chamber depending on the factors above in view of this disclosure. The chamber will have to be in fluid communication with the opening into the housing. Thus, in one embodiment there is an opening in the top of the chamber that matches the opening in the bottom of the housing. No spark arrestor is needed at this interface. It should be noted that use of the chamber means there is no need to have a top on the frame. The housing can act to seal and act as the frame top and when supported from above, means that simple panels or the like can be used to create a chamber since the chamber need not support the housing.

The positioning of a second air filter in the airflow path after the first air filter is an embodiment of the blower housing with first filter roller filter. The second air filter can be of any type including a second roller filter but in one embodiment the second filter is a canister filter. The filters, both first and second all can be equipped with a cleaning system such as a pulse system. Another cleaning means is the use of a drawer beneath the first or second filters of the present invention. Large particulate material or in the case of pulse cleaners, anything blown off the filter will by gravity travel downward. By positioning a drawer beneath the filter, the drawer can be accessed from the outside of the housing without the need to access the filter to clean the particulate matter from the housing. Should filters need to be changed, cleaned by hand, or the like, a door or the like, in the blower housing will provide access from the outside environment to inside the housing for this purpose. The particular design of use of drawers, as well as the roller filter and dual filter design, is intended to maintain the inside of the blower housing clean and reduce the frequency of the changing of filters, especially the secondary filters such as canister filters.

In some instances it may be desirable to add a third filter in the airflow path after the second filter. In this case, in one embodiment the filter would be a HEPA filter. By use of a HEPA filter, air returning to the environment surrounding the welding station would be as clean if not cleaner than originally in the chamber prior to the beginning of the welding process.

Other air cleaning and welding station accessories and the like could also be added to the device of the present invention as desired. These include fire suppression systems sprinklers and the like.

Now referring to the drawings, FIG. 1 depicts an embodiment of a roller filter 20 of the present invention. A roller filter 20 consists of a feed reel 23 and a take up reel 24. A long length of filter material 25 is wound up on the feed reel 23 and strung across the airflow path to take up reel 24. Airflow indicated by arrow 30 reaches the filter material 25 strung between the two reels and must pass through the filter material 25 to continue on its path in the airflow path of a blower housing. Filter material 25 is taken up on reel 24 by take up motor 31 attached to take up reel 24 by band 32 and winds the wheel such that when activated the take up reel can move to a clean piece of filter material 25. The motor can be automated with sensors to detect when the filter is dirty or can be manually advanced or the motor engaged manually. After airflow passes through filter material 25 it continues through the airflow path indicated by arrow 35. Take up reels and feed reels are known within the art and based on the disclosure herein can easily be adapted to accommodate placement in a welding station blower housing.

The positioning of the roller filter 20 is early within the airflow path and will be the first filter reached in the path. The roller filter as described above can be positioned in the airflow path within or outside of the blower housing. The roller filter is designed to last a long time and prevent or reduce maintenance of secondary air filters later in the airflow path. Use of the roller filter, for example with a cartridge air filter as a secondary filter will decrease the need to access the interior of the blower housing to change the cartridge filters.

Figure 2:
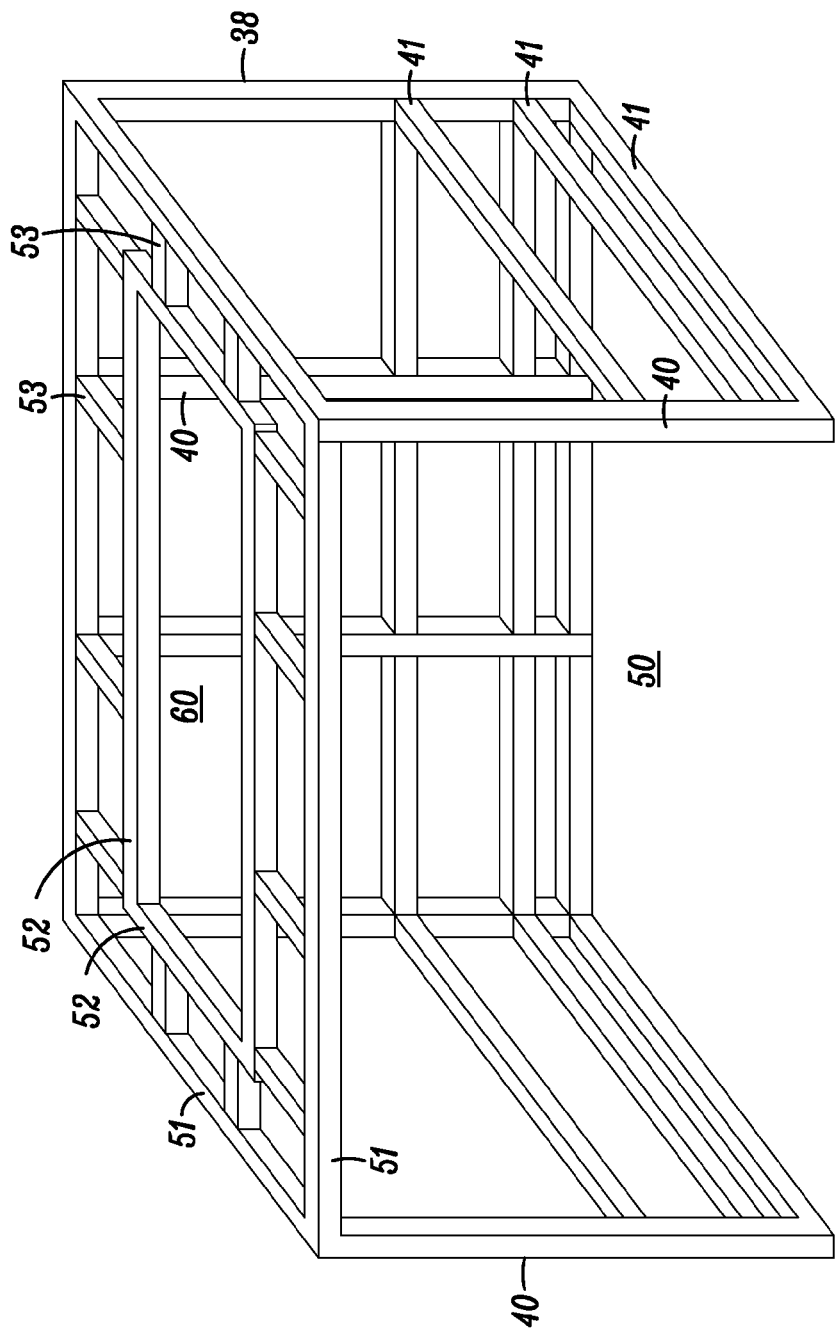
FIG. 2 is a perspective view of a welding chamber frame embodiment depicting the horizontal post grid.

FIG. 2 is a perspective view of a frame 38 for a welding station chamber of the present invention. It is made entirely of post material, instead of post material for uprights and beam material for the top frame as described in previous welding chamber frames. Upright posts 40 define the exterior of the frame and chamber 50. Some of the upright posts 40 define the corners of the frame while others define areas of the sides or back side of the frame 38. In one embodiment, there are cross posts 41 which connect the upright posts and further reinforce the walls of the welding station frame 38.

The top of frame 38 in this embodiment is designed to support a top mounted blower housing. Since the blower housing with blower filters and the like are relatively heavy, previously a beam construction has been used to support the housing on the top part of the frame. The present invention blower housing with roller filter adds additional weight and the top support of frame 38 becomes even more critical. The present invention top of frame 38 consists of a grid of post material. Perimeter posts 51 define the front, back and side perimeter of the top of frame 38. Airflow opening 60 is defined by opening posts 52 which define the perimeter of the opening 60. The perimeter posts 51 and opening posts 52 are connected to form an entire top by connecting posts 53. Connecting posts 53 are placed around the inner and outer perimeter of the perimeter posts 51 and opening posts 52 respectively, welded at either end to their respective posts. In this embodiment the connection of connecting posts 53 is perpendicular to the other posts. In other embodiments, the connection and placement is as necessary to produce a rigid and supportive top of frame 38.

Figure 3:
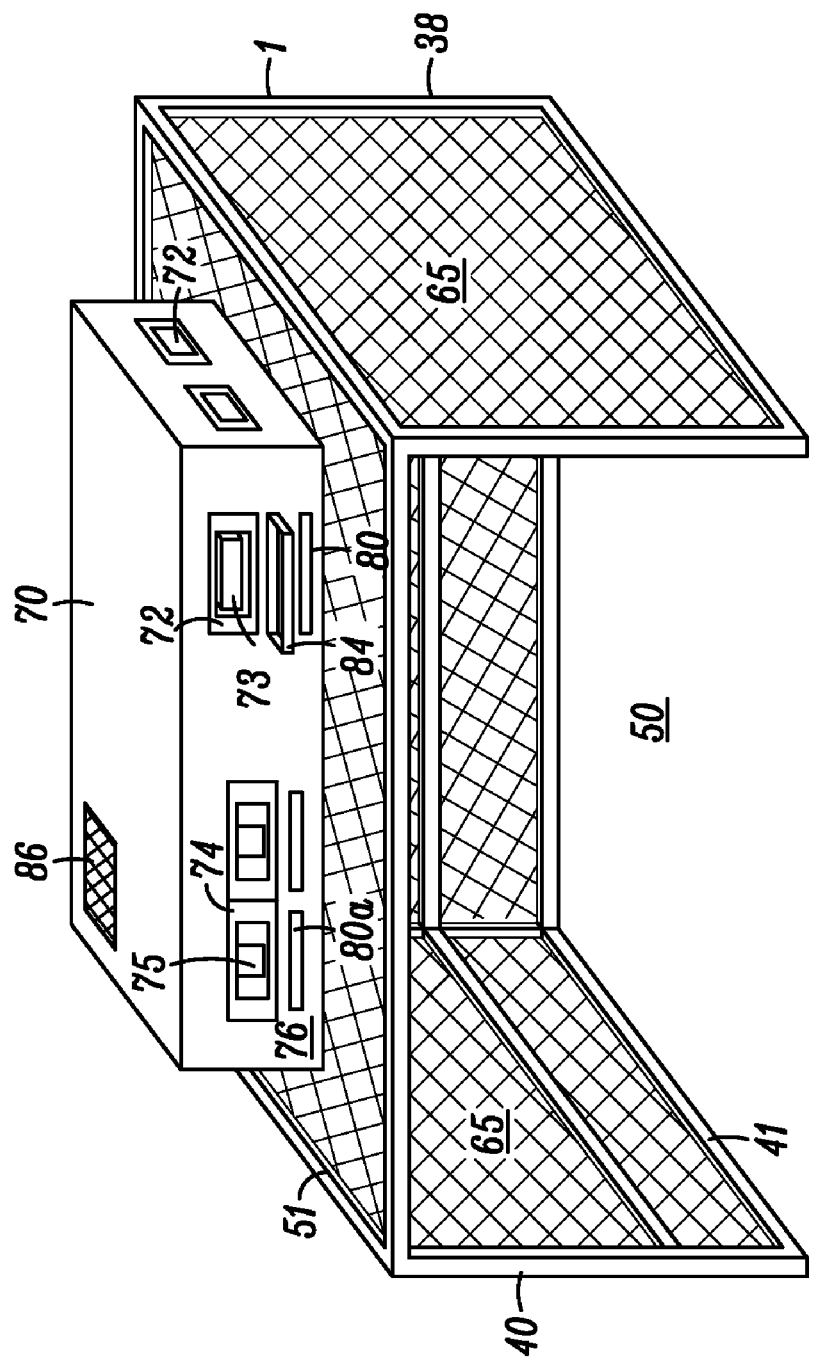
FIG. 3 is a perspective view of an embodiment welding station showing the frame and blower housing elements of the present invention.

FIG. 3 is a perspective view of an embodiment of the welding station 1 of the present invention. In this embodiment frame 38 is covered with metal sheeting material 65 to form the chamber 50 in an enclosed manner. Sheeting 65 is also placed on the top grid, not shown, leaving the opening 60 from FIG. 2 uncovered. Positioned over the opening 60 is blower housing 70. Blower housing 70 contains as seen in other figures, blower first and second filters and the like. From this view one can see doors 72 with windows 73 that allow access to the first filter the roller filter. Doors 74 with windows 75 allow access to the interior of the blower housing 70 to access the second filter. Positioned on the front 76 of the blower housing 70 are particle collection drawers 80. Drawers 80 positioned underneath the first and second filters in this embodiment collect materials that fall from the filter. The drawers 80 can be pulled from the outside of the welding station 1 to clean without having to open doors 72 or 74 and expose the interior of the blower housing 70 to the surrounding environment. This embodiment also includes a drawer containing steel mesh 84. Drawer 80 pulls out allowing one to remove and clean the steel mesh.

Finally, in this view, one can see the exhaust vent 86 in which air passing through the blower housing and corresponding filters exits to the environment. Should additional filtration be desired, one could have an embodiment where a third filter such as a HEPA filter is positioned so that exhaust passing the vent 86 would be channeled through a HEPA filter prior to exhausting to the surrounding environment.

Figure 4:
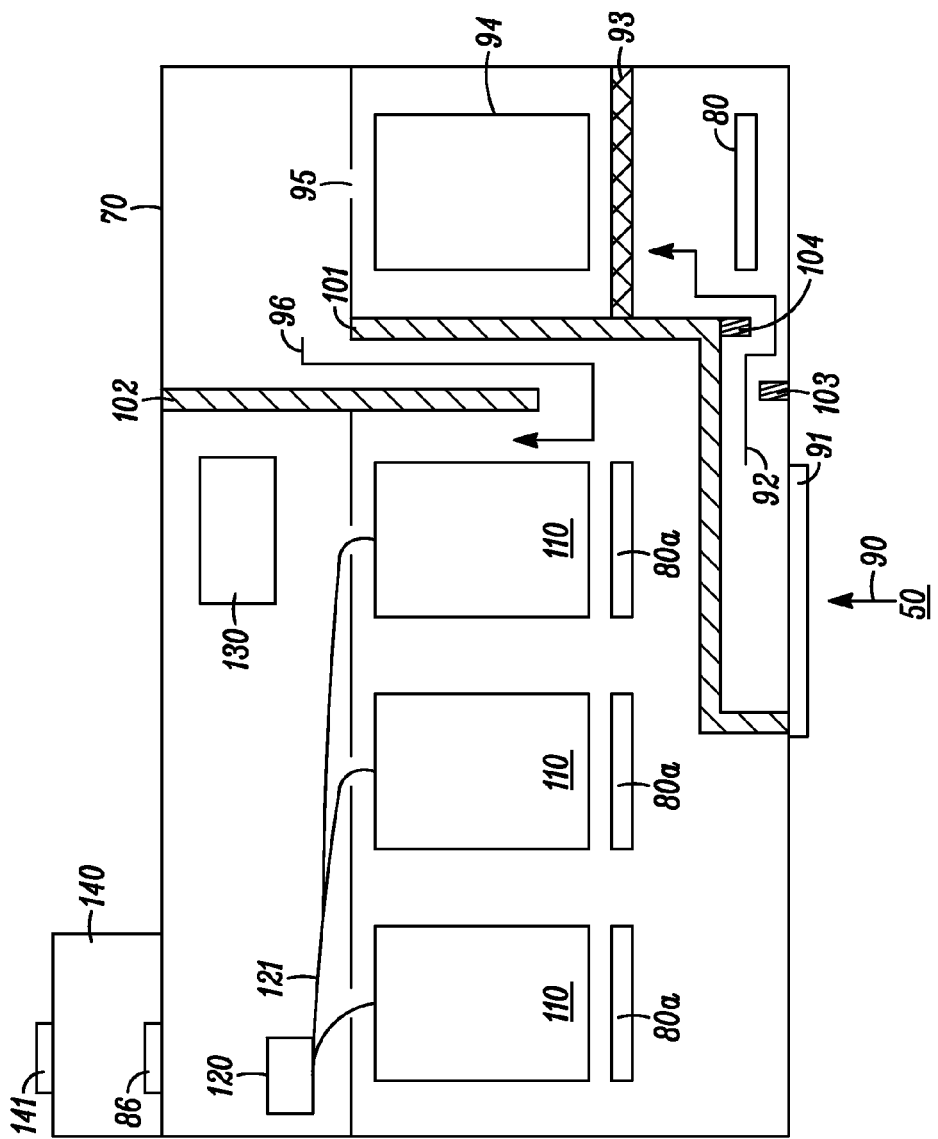
FIG. 4 is a front view of a flow diagram of an embodiment of an air cleaner system of the present invention.

FIG. 4 is a front view airflow path embodiment of the inside of a blower housing 70. Other embodiments of air flow could be used based on the disclosure herein and are within the skill in the art based on this teaching. Air coming from chamber 50 in the direction of air flow direction arrow 90 enters the blower housing 70 though spark arrestor 91. Any welding spark will most likely be caught here, but in another embodiment, a second or third spark arrestor can be positioned within the airflow path as desired. Air then moves as depicted by arrow 92 to reach a side view of metal screen 93. In this embodiment air flow dams 103 and 104 help change the direction of the air flow. The air passes through metal screen 93 which traps larger particles being carried in the air. Any material dropping from metal screen 93 is caught by drawer 80. After passing through the metal screen 93 it reaches the roller filter 94 depicted as a box. Air is further channeled by use of dams such as wall 101 and 102 which helps channel air further in the desired direction. While multiple air flow dams are depicted the exact number are within the skill in the art to control air flow characteristics.

After passing through the roller filter 94, the filter is positioned so that air must be channeled through roller filter opening 95. Air moves as depicted by arrow 96 until it reaches a series of second canister filters 110. Second canister filters 110 are depicted as canister filters but could be any air filter as desired. The canister filters 110 depicted also have a cleaning system comprising pressurized air blower 120 which delivers air in a reverse airflow direction, via tubes 121 which can thus remove material collected on the filters 110 and thus caught by drawers 80a. Air is drawn through the system by blower 130 positioned in this embodiment toward the end of the airflow path but one skilled in the art could position the blower 130 as necessary within the airflow path or outside as desired.

Air that has now been filtered by roller filter 94 and canister filters 110 exits the housing 70 through exit 86. The air in this embodiment enters third filter HEPA filter 140 which then exits to the environment via HEPA filter exit 141, delivering clean air to the surrounding environment. One skilled in the art would be able to size, design filters and the like consistent with the figures and description herein.

Figure 5:
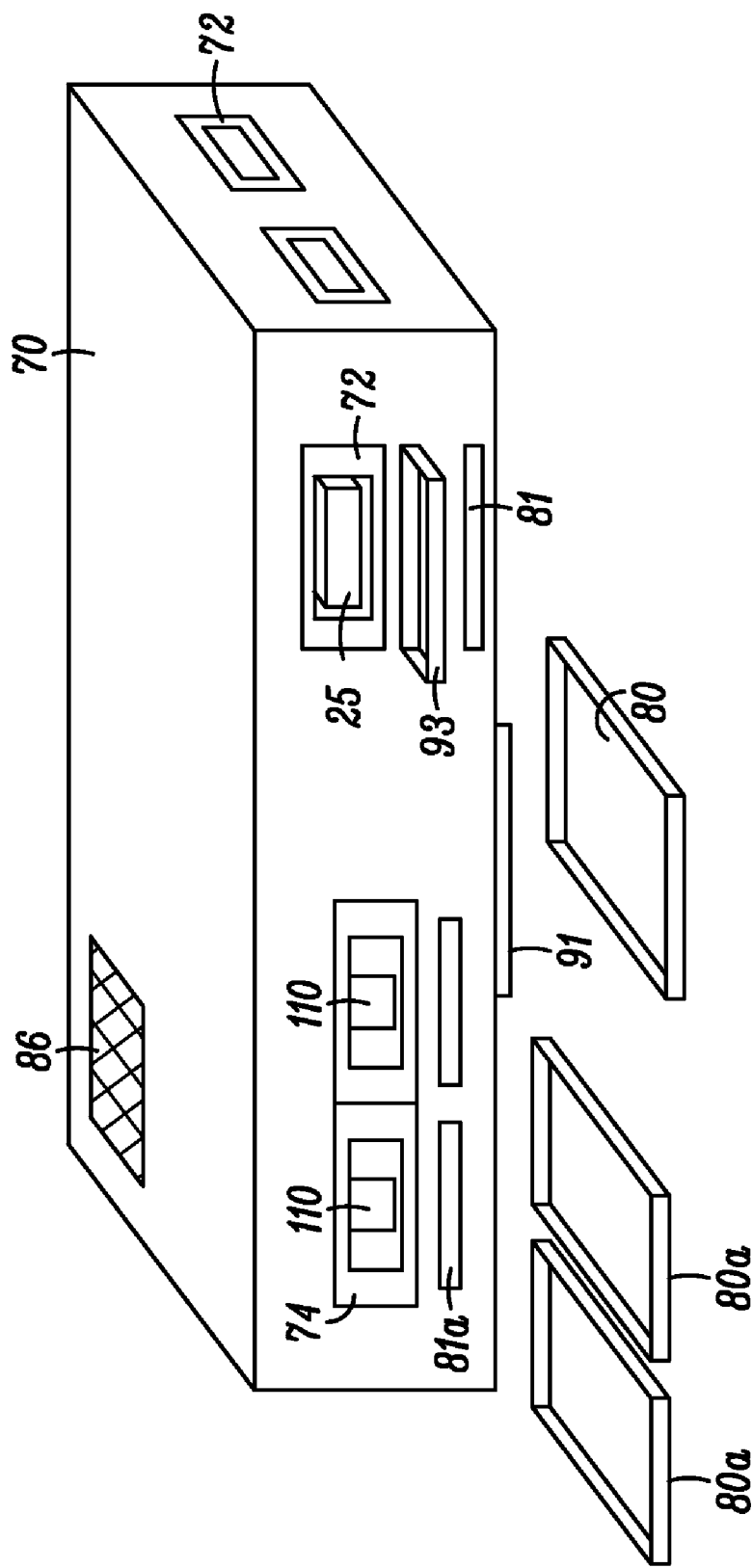
FIG. 5 is a perspective view of air filter cleaning drawers of the present invention.

FIG. 5 is a close up view of the blower housing 70 of the present invention. The drawers 80a and 80 are pulled all the way out of drawer slots 81a and 81 respectively. The drawers 80a and 80 can thus be cleaned before returning them to the blower housing 70 for reuse. The number and size of drawers can be determined based on the specific use but is well within the skill in the art once armed with the present invention details. Above drawer slot 81 is metal screen 93 partially pulled out of housing 70. The metal screen can be pulled all the way out of the housing for cleaning. The metal screen can be inserted just as a screen or can be placed in a slide drawer or the like to aid in supporting the screen inside the housing 70.

Behind door 72 can be seen roller filter 20 positioned within housing 70. Air entering the spark arrestor 91 moves to the roller filter 20 after passing through the metal screen 93. After passing through the roller filter air reaches the canister filters 110 as seen through the window in door 74. After passing through the canister filters 110 the air can exit at exit 86 to the surrounding environment. As mentioned above a HEPA filter can be positioned, in one embodiment over exit 86 in order to give air exiting the housing 70 a final cleaning that meets HEPA standards. As discussed above in FIG. 3, the blower housing sits on the frame of the welding chamber and thus due to the design occupies minimal space while delivering cleaner air with fewer air filter service changes than previously possible with other designs.

Figure 6:
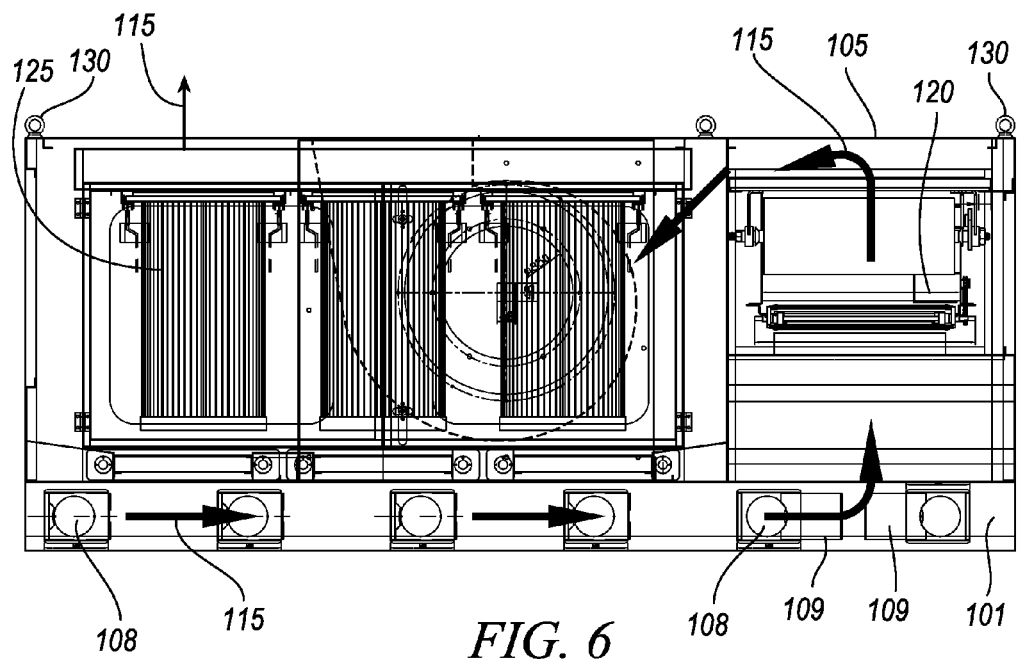
FIG. 6 is a cut-away side length view of an embodiment of the invention having an air inlet chamber.

FIG. 6 is a cut-away side length view of an embodiment of the invention having an air inlet chamber. The air inlet chamber 101 runs the length of the blower housing 105. Along the length of the air inlet chamber 101 are several air inlets 108. In the view of FIG. 6 there are shown 6 air inlets 108 however, the opposing side of the air inlet chamber 101 has an additional 6 air inlets 108. Each air inlet 108 is fitted with sliding door 109. Other means of creating an inlet with a variable or damping door are within the skill in the art and the inlets are not limited to the embodiment portrayed in the figure. By moving the sliding door 109, one can entirely close the air inlet 108, entirely open it or partially open it. When the housing is positioned over a chamber or a welding machine or the like instead of taking air from just one position it takes air from a number of different areas. Arrows 115 indicate the route of air travel from the chamber 108 to the housing 105 and out again. In this embodiment there is no spark arrestor but two air filtering systems are shown. A roller filter 120 is the first filtering system air being filtered 115 reaches and then the air cleaners with pulse cleaning 125 are reached before exiting housing 105. Optionally a HEPA filter could be added to further filter the air.

The particular air blower housing 105 of the embodiment shown in FIG. 6 shows eyelets 130. The eyelets 130 are positioned in a top portion of the housing and designed so that the air housing unit can be hung over a welding chamber, other types of chambers or as desired. Cables could attach to the eyelets 130 and hang the unit from the ceiling or from above attached to a frame or other device for supporting the housing from above. While eyelets are shown one skilled in the art could develop other methods and designs for supporting the housing from above based on the disclosure herein. Other hanging devices such as cables, above supporting frames, or the like could be used to achieve the same support from above. The air housing unit can then be positioned over a frame without actually being supported by the fame and thus reduce the need for sturdy framing such as the above described post and grid frame, to support the housing 105.

Figure 7:
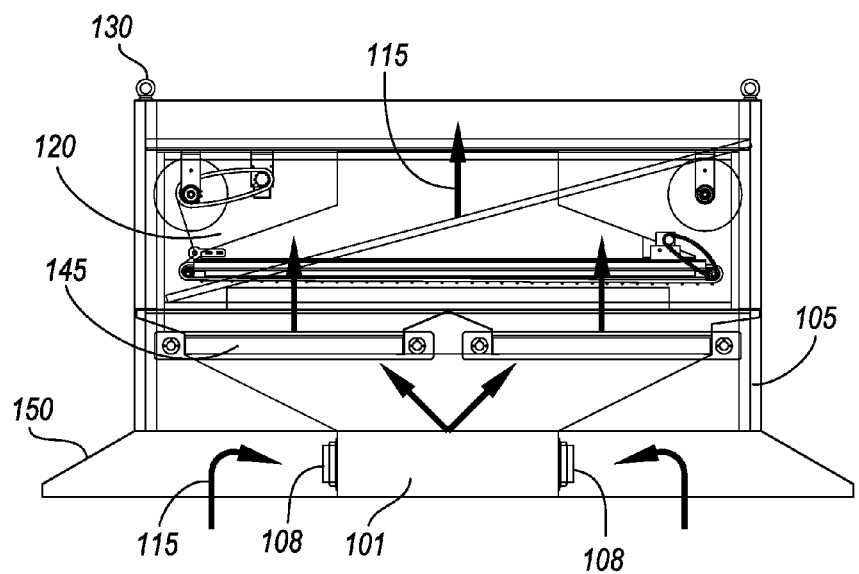
FIG. 7 is a cut-away view side width view of an embodiment of the invention having an air inlet chamber.

In FIG. 7 there is an end on exposed view of an embodiment of the present invention showing the air inlet chamber 101 from the side. As can now be seen viewing FIG. 7 along with FIG. 6, the air inlet chamber 101 runs the length of the housing 105 and is centered in the middle of the width of the housing 105, taking up about a third of the width. One skilled in the art could easily change the dimensions relative to the housing dimensions as well as the shape since the rectangular shape of the channel could easily be changed as desired to columnar, or any other desired shape. This view also shows the addition of hood 150. The hood 150 is attached to the bottom of the housing 105 around the bottom periphery. When the housing 105 is hung by the eyelets 130 then the housing 105 can be lowered so that the housing covers the frame used with the air cleaning system. The housing could be the same size as the frame or be larger. Since the frame does not need to support the housing the hood can be made of any material suitable for use with an air cleaning system. Also shown in the view of FIG. 7 is that the air flow 115 can go through one or more (in this case two) metal filters prior to reaching the roller filter 120. The metal filter could be used as a third filter to remove very large particles prior to reaching the roller filter.

Figure 8:
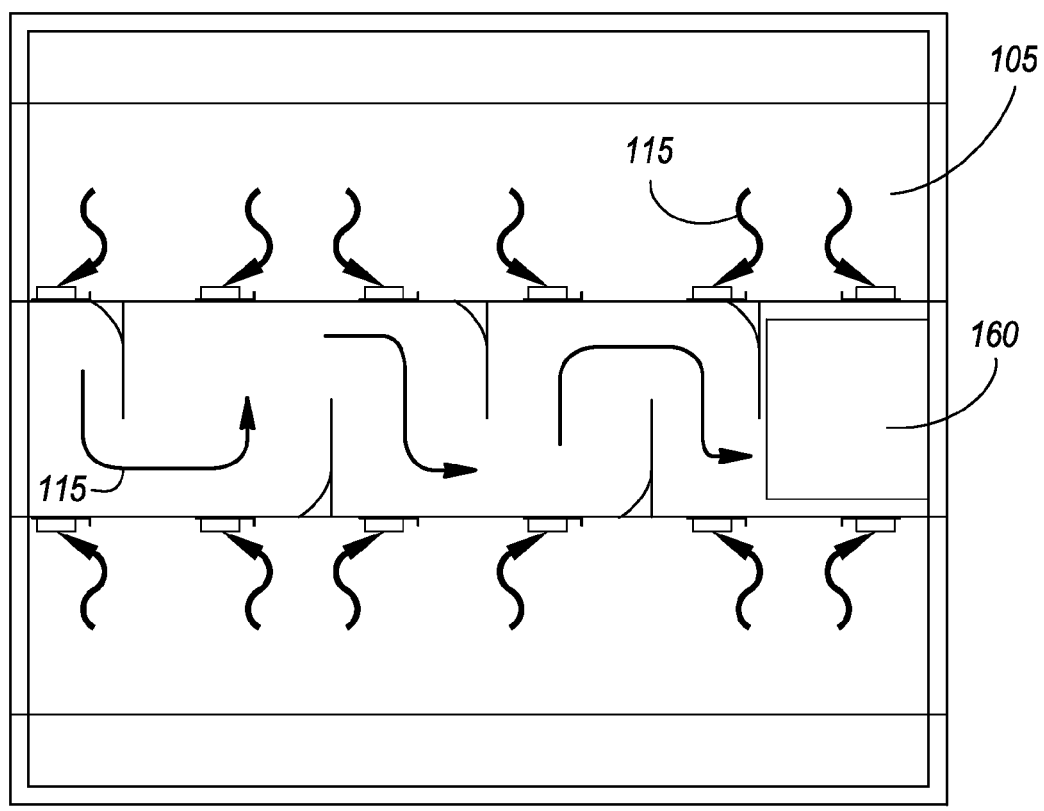
FIG. 8 is a bottom view of a housing with an inlet chamber mounted lengthwise on the bottom of the housing.

As can be seen, the air taken into the chamber travels in chamber 101 prior to entering housing 105. The extra distance traveled by the air prior to entering the housing 105 allows for any sparks to burn out before entering the housing thus eliminating the need for a spark arrestor. In FIG. 8 the housing 105 and chamber 101 are viewed from beneath. In this view that is a cut away view, the internal air deflectors 155 are shown. The air deflectors 155 allow the air to travel a circuitous path and thus increase the distance air travels before entering the housing. In this view there are 5 air deflectors 155 however the exact number is going to be based on the size of the system, the number of air inlets and the like, and is adjustable by one skilled in the art in view of this disclosure. Once again this helps prevent the need to have a spark arrestor with the system. The cut away view of FIG. 8 also shows exit portal 160 which is actually positioned on the side of chamber 101 closest to the housing 105 i.e. a top portion based on previous shown embodiments.

Figure 9:
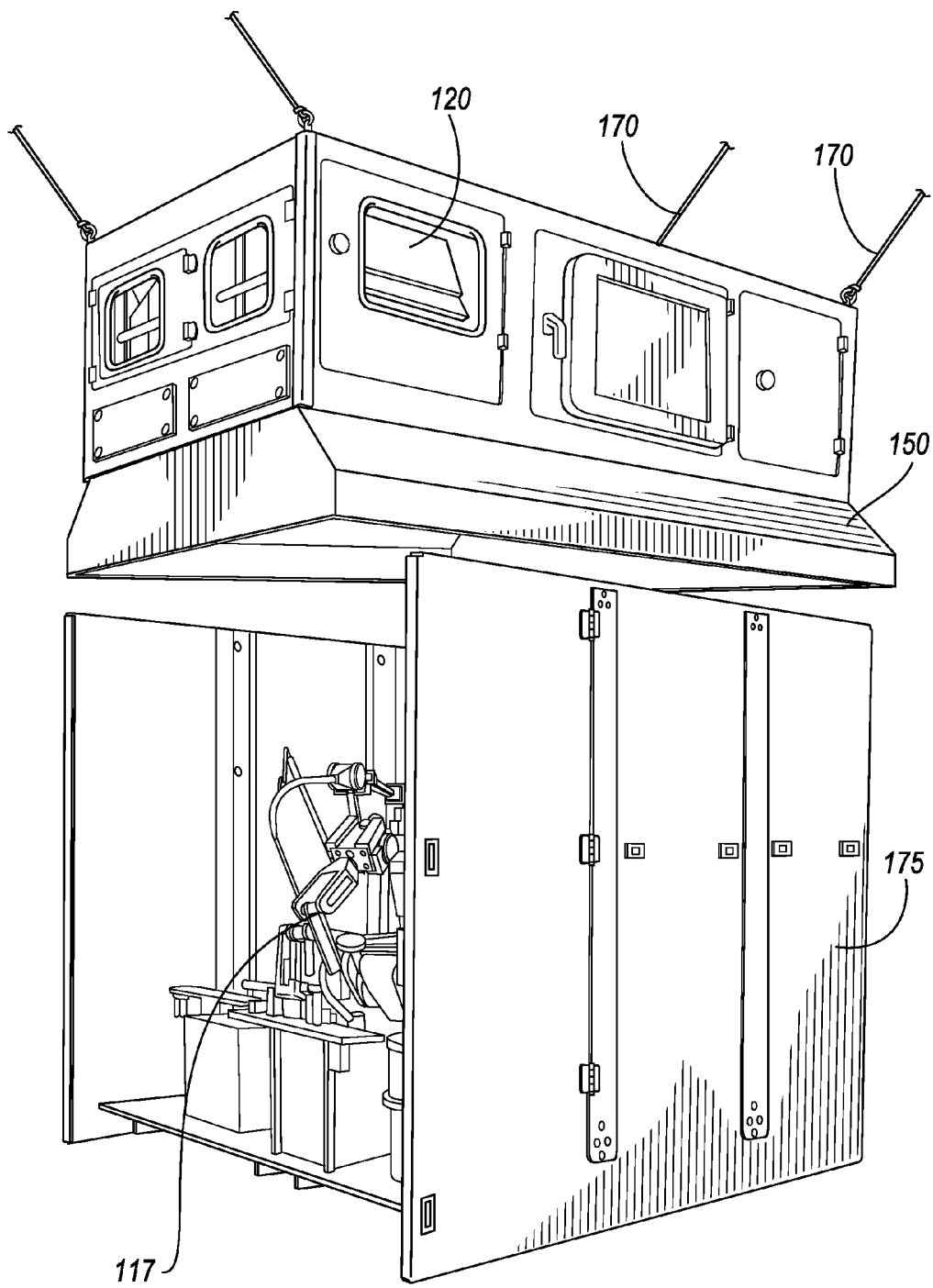
FIG. 9 is an embodiment of an air cleaning system of the present invention hung over a welding chamber where a frame is not necessary to support the air cleaning system.

FIG. 9 is a perspective view of the air cleaning system without the spark arrestor and with hood 150. The housing 105 is hung in the air via cables 170 attached to each of the eyelets 130. This embodiment also depicts a 3 walled chamber 175 and a robotic welding machine 117. The chamber 175 is made of relatively lightweight material not designed to withstand the weight of the air cleaning system resting on it. By hanging the air cleaning system it can be supported from above and hang in the position show or right up against the frame.

One skilled in the art will be taught based on the disclosure of the present invention, other embodiments and substitution, arrangement of elements and the like are taught based on the disclosure and the accompanying figures. The figures are not intended to be limiting and the claims which follow are thus not to be limited, but rather interpreted in view of the broad teaching disclosed herein.

What is claimed is:

1. An air cleaning system for a welding station having a blower comprising a roller filter positioned in an airflow path inside of a housing of the air cleaning system the roller filter comprising:
   a) a feed reel;
   b) a take up reel; and
   c) a length of filter material for filtration of air from the welding station wound up on the feed reel and strung across the airflow path to the take up reel such that the airflow passes through the filter material and the filter material can be advanced from the feed reel to the take up real to position a new portion of filter material in the airflow path but remains stationary while filtering the airflow;
   wherein the roller filter is positioned in the airflow in the housing so as to be unaffected by welding sparks.

2. The system according to claim 1 wherein the roller filter is positioned within the blower housing.

3. The system according to claim 2 wherein there is at least one spark arrestor positioned in the airflow path prior to the roller filter.

4. The system according to claim 1 wherein the roller filter is positioned in a housing separate from the blower housing.

5. The system according to claim 1 wherein there is a drawer beneath the roller filter for collecting particulate matter which falls off the roller filter.

6. The system according to claim 1 wherein the housing is mounted on a welding booth frame, 7. The system according to claim 1 wherein the housing is hung from the top of the housing over a welding booth.

8. The system according to claim 1 wherein there is a motor attached to the take up real to advance the filter material from the feed reel to the take up real.

9. The system according to claim 1 which further comprises a HEPA filter.

10. The system according to claim 1 which further comprises a pulse cleaning filter.

11. The system according to claim 1 wherein the portion of the filter that is positioned in the air flow path is not supported on a top or a bottom thereof.

12. The system according to claim 1 wherein the roller filter is positioned in the airflow so as to be unaffected by welding sparks by positioning one or more air flow darns in the airflow path prior to the roller filter which change the direction of the airflow within the housing.

13. the system according to claim 1 which further comprises at least one spark arrestor and one metal filter positioned in the airflow path prior to the roller filter and both another filter and a HEPA filter positioned after the roller filter.

14. The system according to claim 12 wherein the another filter is a pulse cleaning filter.

* * * * *